United States Patent [19]

Schilling

[11] 4,373,126
[45] Feb. 8, 1983

[54] PROCESS FOR ELIMINATING ERRORS IN PREPOSITIONING PIECES TO BE MANUFACTURED BY ELECTRO-EROSION

[75] Inventor: Franz Schilling, Saint Remy les Chevreuse, France

[73] Assignee: Sfena, Velizy Villacoublay, France

[21] Appl. No.: 110,111

[22] Filed: Jan. 3, 1980

[30] Foreign Application Priority Data

Jan. 11, 1979 [FR] France ............................... 79 00601

[51] Int. Cl.$^3$ .............................................. B23P 1/08
[52] U.S. Cl. ............................ 219/69 M; 219/69 R; 219/68; 403/119; 403/220; 33/318; 29/11
[58] Field of Search ............... 219/69 M, 69 R, 69 P, 219/69 G, 68, 56; 29/11; 403/119, 220; 33/324, 316, 318

[56] References Cited

U.S. PATENT DOCUMENTS 3,723,690 3/1973 Nakada et al. ................... 219/69 M

OTHER PUBLICATIONS

"IBM" Technical Disclosure, Electric Arc Stripping, vol. 12, #8, 1-1970.

Finommechanika–(Hungary) pp. 161–165, vol. 10, #6, 6-1971, "Micro–Electro–Spark Machining Part I".

*Primary Examiner*—M. H. Paschall
*Attorney, Agent, or Firm*—Browdy and Neimark

[57] ABSTRACT

An improved machining process using electro-erosion to form integral hinges in rods in making flexible and/or electric suspension blades for various industrial devices.

The machining process includes repeatedly eroding a rod alternately on two opposite sides to form two curved indentations, one on each side of the rod at a given point along its length, using a curved cylindrical electrode, so that the rod is progressively narrowed at this point until the required thickness of hinge is obtained. The process may also include, using as reference planes, to position the eroding electrode accurately, surfaces of a frame to which the rods have been attached. In this way, the rods are accurately prepositioned and thin hinges are produced with a repeatable high accuracy.

Products made by this process include a pendulum-type accelerometer and an elastic support for a gyroscope useful in aeronautical applications.

6 Claims, 6 Drawing Figures

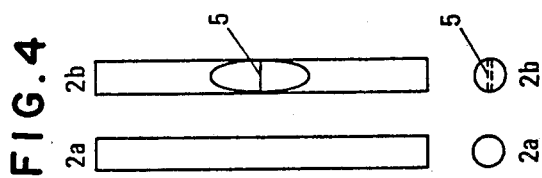
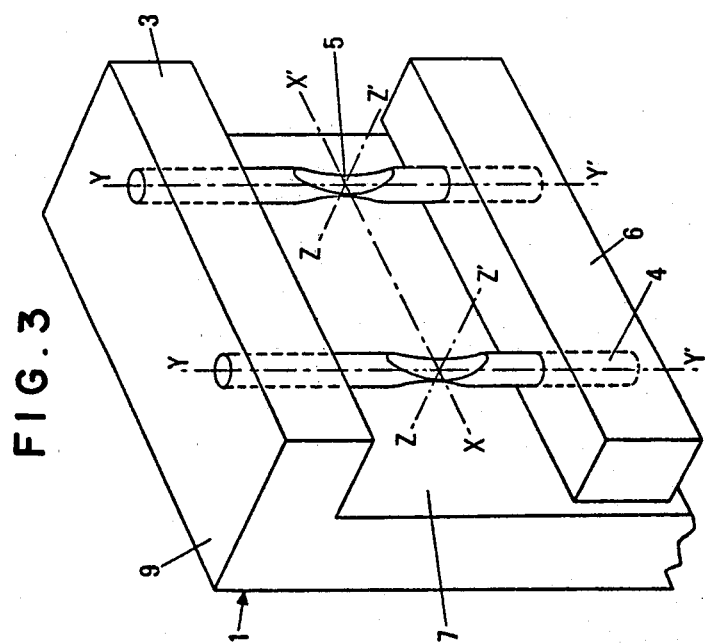
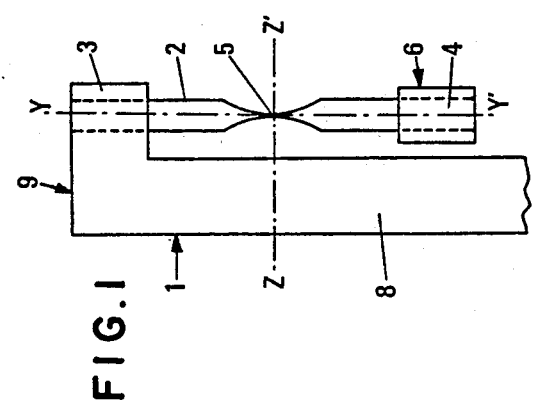
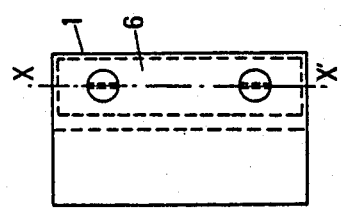

PROCESS FOR ELIMINATING ERRORS IN PREPOSITIONING PIECES TO BE MANUFACTURED BY ELECTRO-EROSION

BACKGROUND OF THE INVENTION

The present invention is related to a process of machining parts by electro-erosion and to various industrial products, such as accelerometers or gyroscopes, made by practicing this process.

More particularly, the present invention is related to a process for obtaining flexible and/or elastic suspension blades processing an extremely thin linear section.

The invention further relates to a procedure for accurately prepositioning the parts, which are to be machined.

One example of a precision-made product machined according to a process described above is a pendulum type accelerometer which contains two blades formed from two parallel rods with aligned integral hinges, having a thickness of a few microns in their central sections.

A second example is the elastic suspension for a gyroscope, where rotation in two perpendicular axes is controlled by two pairs of rods, each pair having aligned integral hinges, having a thickness of a few microns in the central sections of the rods.

SUMMARY AND OBJECTS OF THE INVENTION

In particular, the invention relates to a process for electro-erosion machining a rod to form an integral hinge at a point along its length by repeatedly eroding the rod alternately on two opposite sides to form two curved indentations, one on each side of the rod at the said point, using a curved electrode so that the rod is progressively narrowed at this point until the required thickness of hinge is obtained.

The invention also relates to a process for electro-erosion machining a rod, one end of which is attached rigidly to a frame, by positioning the eroding electrode using as a reference positioning plane one surface of the said frame, and thus avoiding errors in locating that part of the rod to be machined.

An advantage gained by using a reference plane as described above is that the parts to be machined on a given assembly, containing one or more rods, may be located with consistently good accuracy. For example, if integral hinges are to be machined in an assembly using a process according to the invention, the axes of the hinges may be aligned accurately, or made accurately perpendicular to each other as required. By choosing a reference plane, cumulative errors in positioning successive hinges are avoided by this process, and no undue mechanical stresses are introduced when parts of the assembly are caused to rotate about the hinges. Furthermore, the process may be extended to mass production.

A further advantage gained by using a process according to the invention for making hinges in precision apparatus such as accelerometers and gyroscope supports, is that the finishing process on the hinges is the last operation performed in constructing the apparatus; therefore there are no subsequent mechanical procedures which would risk damage to the fragile parts. Considering the brittleness and high cost of the parts involved in such apparatus, this is of great benefit to the industry.

BRIEF DESCRIPTION OF THE DRAWINGS

The invention is now illustrated in greater detail by a description of the construction and method of production of these two examples, with reference to the accompanying drawings in which:

FIGS. 1 and 2 show a side view and top view of the pendulum type accelerometer with one degree of freedom, made by a process according to the invention;

FIG. 3 is a perspective view of the same accelerometer, illustrating the central integral hinges in the rods, and the flexion axis XX';

FIG. 4 shows sections along YY' of a solid rod before machining (2a) and after machining (2b)

DETAILED DESCRIPTION OF THE PREFERRED EMBODIMENTS

Figure 5:
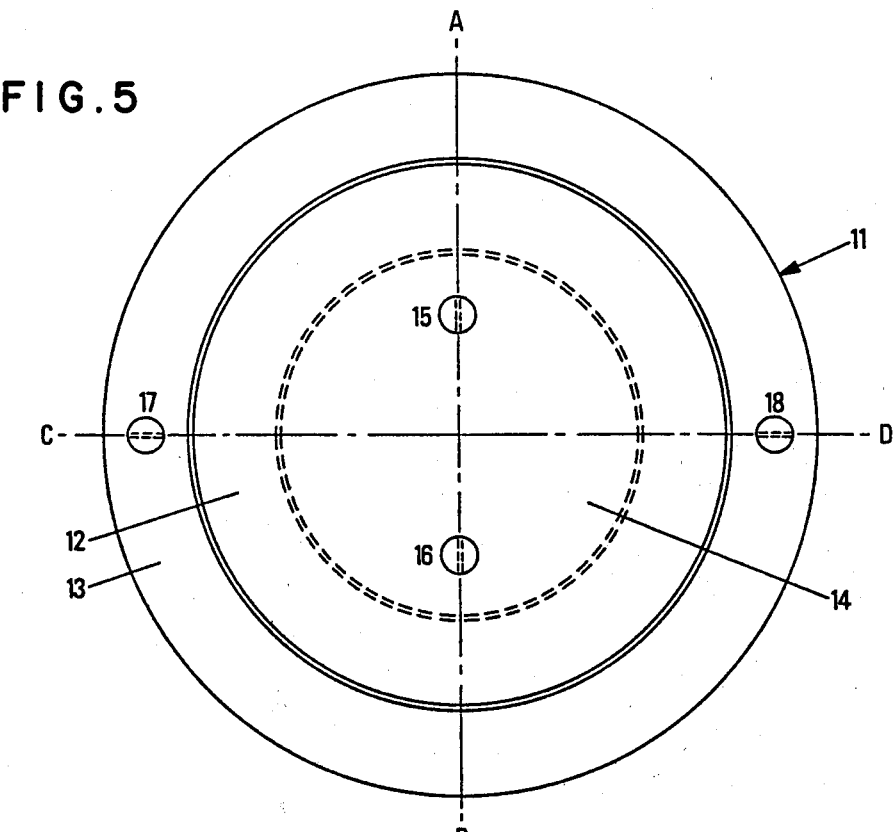
FIGS. 5 and 6 show top and side cross-sections respectively of a two-degree-of-freedom elastic suspension for a gyroscope, constructed using a process according to the invention.

FIGS. 1 to 4 illustrate the processes according to the invention, and a pendular-type accelerometer machined according to these processes. A thin hinge 5 is formed in a rod 2 by machining indentations of arcuate cross-section in opposite faces of the central section of the rod, using a cylindrical electrode (not shown). Electro-erosion is performed successively on one side and on the opposite side of the rod, the rod becoming narrower in the ZZ' axis. Hinges of only a few microns thickness are possible by this method.

The hinges are machined after the assembly is complete, so as to avoid the risk of damage to the hinges or distortion of the apparatus as a result of mechanical processes during assembly. The accelerometer assembly shown in FIGS. 1 to 4 comprises a pendular weight 6 suspended from a support frame 1 by two rods 2 with central hinges 5 to allow flexion along the XX' axis. The rods are rigidly mounted in recesses in a section 3 of the support frame and in recesses 4 in the pendular weight 6. The rods are shown as having cylindrical cross-section, but obviously they could equally well be square, rectangular or polygonal with an even number of faces.

The reference planes used for positioning the eroding electrode accurately are faces 7, 8 and 9 on the support frame.

Figure 6:
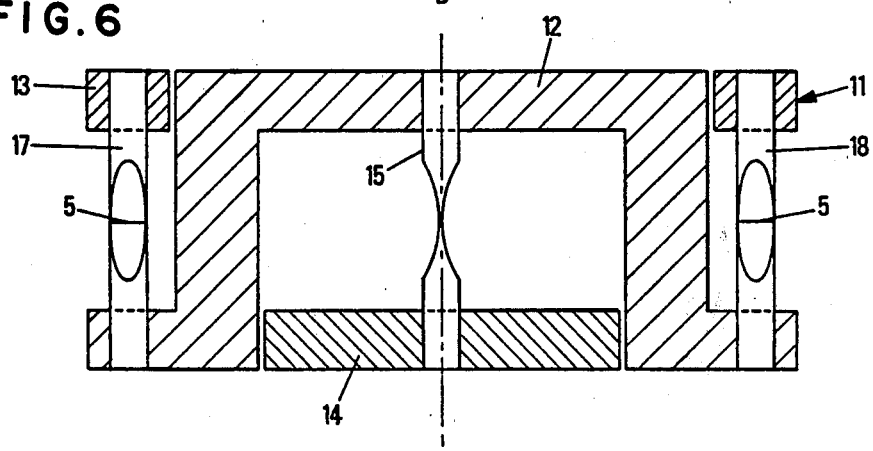

FIGS. 5 and 6 show an example of an elastic suspension for a gyroscope, where movement in two degrees of freedom is achieved with two pairs of hinged rods. As before, the final machining of the hinges is left as the last process after the assembly of the parts.

The gyroscope platform disc 14 is supported by two hinged rods 15 and 16 which are attached at their upper ends to a cylindrical support frame 12. The platform disc 14 is free to rotate about an axis AB. The cylindrical support frame 12 is itself supported by two hinged rods 17, 18 attached at their upper ends to a rigid support 13. The support 12 is free to rotate about an axis CD which is perpendicular to AB, thus defining a second degree of freedom of the gyroscope platform disc.

The rods and support are assembled by conventional processes, holes being bored in the support to receive the rods. When all the rough-machining is completed and the parts assembled, the electro-erosion process according to the invention is employed to make the four hinges with great accuracy.

The tuned elastic suspension of gyroscope 11, as shown in FIGS. 5 and 6 has three annular elements 12, 13, 14 interconnected two-by-two: 13 with 12, and 14 with 12 using two rods respectively 17 and 18 for annular elements 12 and 13, and 15 and 16 for annular elements 12 and 14.

The converging position of axes CD and AB of the said rods is highlighted in these figures.

The preliminary positioning of rods, linking to one another a fixed element and a moving element, is effected according to a method known to the prior art.

In the case of the pendulum (FIG. 3), two parallel vertical holes are simultaneously bored in weight 6 of the pendulum and the corresponding section 3 of the support; holes intended for receiving the ends of the two solid rods 2a; or rough machined.

In the case of the tuned elastic suspension of a two-degree-of-freedom gyroscope, alignment of the holes in the prolongation of one another, two-by-two, is also effected according to a method known to the prior art.

Two methods of a electro-erosion already known in the prior art are suitable for practicing this process. The first is electrolytic erosion, where a steady current is passed between an electrode and the workpiece with an electrolyte flowing between the two. The second is electro-sparking where ions are removed from the workpiece as a result of sparking between electrode and workpiece, with a coolant fluid passing between the two.

This invention provides a significant improvement in the production of precision made apparatus, in that a repeatable accuracy may be obtained, and fewer products wasted through damage.

I claim:

1. A process for forming an integral hinge in the form of a flexible suspension blade in a rod by electro-erosion machining, said rod attached at one end thereof to a frame having three plane surfaces disposed at right angles to one another, comprising the steps of positioning curved electro-erosion electrodes accurately by means of coordinates formed with respect to said plane surfaces and, repeatedly eroding the rod alternately on two opposite sides symmetrically disposed about the axis of the rod so that the rod becomes progressively narrowed at this point in the form of two opposing inwardly curved indentations until the required thickness of the hinge is obtained wherein said integral hinge is formed at a portion along the length of the rod.

2. A pair of aligned hinge elements integrally formed into a pair of spaced parallel rods, each said rod being formed according to the process of claim 1.

3. A process, as claimed in claim 1, wherein each of said two opposing inwardly curved indentations is in the form of an arc of a circle, and said electrodes are cylindrical.

4. A process, as claimed in claim 3, in which the thinnest part of the flexible section of the rod is a few microns in thickness.

5. In an accelerometer pendulum comprising a pendular mass connected to a support housing by means of an aligned pair of rods, the improvement wherein said aligned pair of rods has linear flexible portions each of which constitutes an integral hinge, the axes of said hinges being aligned, and said flexible portions being formed by electro-erosion machining using curved electro-erosion electrodes positioned accurately by means of coordinates formed by attaching each said rod at one end thereof to a frame having three plane surfaces disposed at right angles to one another, and repeatedly eroding each said rod alternately on two opposite sides symmetrically disposed about the axis thereof so that said rod becomes progressively narrowed at this point in the form of two opposing inwardly curved indentations until the required thickness of the hinge on each said rod is obtained.

6. In an elastic suspension for a two-degree-of-freedom gyroscope comprising three annular interconnected cylindrical elements including a pair of rods, the improvement wherein each said rod has a reduced thickness flexible portion forming a hinge whereby the axis of one said hinge is aligned with the axis of the other said hinge, said reduced thickness portions each being formed by electro-erosion machining using curved electro-erosion electrodes positioned accurately by means of coordinates formed by attaching each said rod at one end thereof to a frame having three plane surfaces disposed at right angles to one another, and repeatedly eroding each said rod alternately on two opposite sides symmetrically disposed about the axis thereof so that said rod becomes progressively narrowed at this point in the form of two opposing inwardly curved indentations until the required thickness of the hinge on each said rod is obtained.

* * * * *